United States Patent
Jeon et al.

(10) Patent No.: US 10,077,203 B2
(45) Date of Patent: Sep. 18, 2018

(54) APPARATUS FOR FORMING WINDOW GLASS AND METHOD OF MANUFACTURING ELECTRONIC DEVICE INCLUDING WINDOW

(71) Applicant: Samsung Display Co., Ltd., Yongin-si, Gyeonggi-do (KR)

(72) Inventors: Jaeseung Jeon, Yongin-si (KR); Jongkap Jo, Yongin-si (KR); Hyoungsuk Roh, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 105 days.

(21) Appl. No.: 15/177,182

(22) Filed: Jun. 8, 2016

(65) Prior Publication Data

US 2017/0057858 A1    Mar. 2, 2017

(30) Foreign Application Priority Data

Aug. 31, 2015    (KR) .......................... 10-2015-0122787

(51) Int. Cl.
  *C03B 23/03*      (2006.01)
  *C03B 23/023*     (2006.01)

(52) U.S. Cl.
  CPC .......... *C03B 23/03* (2013.01); *C03B 23/0235* (2013.01); *C03B 23/0305* (2013.01); *C03B 23/0307* (2013.01)

(58) Field of Classification Search
  CPC .. C03B 23/03; C03B 23/0235; C03B 23/0305
  See application file for complete search history.

(56) References Cited

U.S. PATENT DOCUMENTS

| | | | | |
|---|---|---|---|---|
| 3,009,201 A | * | 11/1961 | Hansen | B29C 53/043 |
| | | | | 156/486 |
| 4,203,751 A | * | 5/1980 | Roth | C03B 35/20 |
| | | | | 65/106 |
| 4,720,296 A | * | 1/1988 | Bartusel | C03B 23/0357 |
| | | | | 65/106 |
| 4,840,657 A | * | 6/1989 | Orain | C03B 23/0252 |
| | | | | 65/106 |

(Continued)

FOREIGN PATENT DOCUMENTS

| | | | |
|---|---|---|---|
| KR | 10-20110096455 A | * | 8/2011 |
| KR | 10-2015-0000756 A | | 1/2015 |

(Continued)

*Primary Examiner* — Jason L Lazorcik
(74) *Attorney, Agent, or Firm* — Lewis Roca Rothgerber Christie LLP

(57) ABSTRACT

A window glass forming apparatus according to one or more embodiments of the present invention includes a first mold configured to move along a first direction, a pressing member including a first end coupled to the first mold and configured to move along a second direction crossing the first direction, a second mold having a supporting surface configured to support a glass, and a curved surface extending from the supporting surface, and a third mold between the first mold and the second mold, the third mold being coupled to a second end of the pressing member and defining a guide groove configured to guide the pressing member along the curved surface.

7 Claims, 4 Drawing Sheets

(56) References Cited

U.S. PATENT DOCUMENTS

| | | | | |
|---|---|---|---|---|
| 4,891,055 A * | 1/1990 | Shibaoka | C03B 23/0258 | 65/104 |
| 5,009,695 A * | 4/1991 | Kuster | C03B 23/03 | 65/182.2 |
| 5,292,357 A * | 3/1994 | Arnould | C03B 35/205 | 65/260 |
| 5,545,245 A * | 8/1996 | Mizusugi | C03B 23/0254 | 65/273 |
| 8,397,540 B2 * | 3/2013 | Dannoux | C03B 23/0256 | 65/106 |
| 8,549,885 B2 * | 10/2013 | Dannoux | C03B 35/202 | 65/359 |
| 8,833,106 B2 * | 9/2014 | Dannoux | C03B 23/0256 | 65/106 |
| 9,376,337 B2 * | 6/2016 | Odani | G06F 1/1626 | |
| 9,902,640 B2 * | 2/2018 | Dannoux | C03B 23/023 | |
| 2002/0020192 A1 * | 2/2002 | Bader | C03B 23/0256 | 65/33.1 |
| 2010/0000259 A1 * | 1/2010 | Ukrainczyk | C03B 23/0235 | 65/104 |
| 2010/0140848 A1 * | 6/2010 | Provence | B29C 53/04 | 264/339 |
| 2012/0131961 A1 * | 5/2012 | Dannoux | C03B 23/0235 | 65/103 |
| 2012/0288661 A1 * | 11/2012 | Wei | C03B 23/02 | 428/64.1 |
| 2013/0329346 A1 * | 12/2013 | Dannoux | C03B 23/0235 | 361/679.01 |
| 2014/0162029 A1 * | 6/2014 | Takeuchi | C03B 23/0235 | 428/174 |
| 2014/0335322 A1 * | 11/2014 | Luo | C03B 23/0307 | 428/177 |
| 2015/0000339 A1 * | 1/2015 | Jang | C03B 23/03 | 65/106 |
| 2015/0000340 A1 * | 1/2015 | Jang | C03B 23/0302 | 65/106 |
| 2015/0000341 A1 * | 1/2015 | Bisson | C03B 23/0235 | 65/106 |
| 2015/0021570 A1 | 1/2015 | Kim et al. | | |
| 2015/0251943 A1 * | 9/2015 | Wada | C03B 23/0305 | 428/130 |
| 2015/0274570 A1 * | 10/2015 | Wada | C03B 23/0305 | 65/106 |
| 2015/0274572 A1 * | 10/2015 | Wada | C03B 23/0305 | 65/106 |
| 2015/0321940 A1 * | 11/2015 | Dannoux | C03B 35/20 | 65/106 |
| 2017/0008791 A1 * | 1/2017 | Kim | C03C 23/0025 | |
| 2017/0022086 A1 * | 1/2017 | Kim | C03B 23/0302 | |
| 2017/0283295 A1 * | 10/2017 | Immerman | C03B 23/0235 | |

FOREIGN PATENT DOCUMENTS

| | | |
|---|---|---|
| KR | 10-2015-0001142 A | 1/2015 |
| KR | 10-2015-0001964 A | 1/2015 |
| KR | 10-2015-0010411 A | 1/2015 |
| KR | 10-2015-0034048 A | 4/2015 |
| WO | WO2005042420 * | 5/2005 |
| WO | WO2013055861 * | 4/2013 |

* cited by examiner

APPARATUS FOR FORMING WINDOW GLASS AND METHOD OF MANUFACTURING ELECTRONIC DEVICE INCLUDING WINDOW

CROSS-REFERENCE TO RELATED APPLICATIONS

This application claims priority to and the benefit of Korean Patent Application No. 10-2015-0122787, filed on Aug. 31, 2015, in the Korean Intellectual Property Office, the disclosure of which is incorporated herein in its entirety by reference.

BACKGROUND

1. Field

One or more exemplary embodiments relate to an apparatus for forming a window glass and a method of manufacturing an electronic device including a window.

2. Description of the Related Art

A display apparatus includes a display panel, which includes a plurality of pixels and displays an image, and a transparent window that covers a display surface of the display panel.

Recently, as the use of various electronic devices, such as smart phones and tablet personal computers (PCs), has increased, the demand for diversity with respect to design has also increased. To satisfy such diversity with respect to design, research is being actively conducted regarding flexible display panels and curved windows having various complex shapes.

SUMMARY

One or more exemplary embodiments include an apparatus for forming a window glass capable of simplifying a process for forming a window having a complex shape, and a method of manufacturing an electronic device having the window.

Additional aspects will be set forth in part in the description which follows and, in part, will be apparent from the description, or may be learned by practice of the presented embodiments.

According to one or more exemplary embodiments, a window glass forming apparatus includes a first mold configured to move along a first direction, a pressing member including a first end coupled to the first mold and configured to move along a second direction crossing the first direction, a second mold having a supporting surface configured to support a glass, and a curved surface extending from the supporting surface, and a third mold between the first mold and the second mold, the third mold being coupled to a second end of the pressing member and defining a guide groove configured to guide the pressing member along the curved surface.

The first mold may define a supplementary guide groove, and the pressing member may be configured to move along the supplementary guide groove.

The first mold may be configured to move along the first direction, the first end of the pressing member may be configured to move along the supplementary guide groove, and the second end of the pressing member may be configured to move along the guide groove, and the first mold, the first end of the pressing member, and the second end of the pressing member may be configured to move concurrently.

The pressing member may be configured to move along the guide groove and may be configured to apply pressure to at least a first portion of the glass such that the first portion of the glass contacts a first portion of the curved surface.

The pressing member may be configured to apply pressure to a second portion of the glass, such that the second portion contacts the curved surface.

The pressing member may include a bar extending along a third direction crossing the first direction and the second direction, the bar being configured to contact a surface of the glass.

The first mold may further include a heating member configured to heat the glass.

The third mold may have a hollow portion configured to accommodate the second mold.

The curved surface may have a first curved surface adjacent to the supporting surface, and a second curved surface, extending from the first curved surface, and including a portion of the curved surface that is farthest from an end portion of the supporting surface along the second direction.

At least one of the second mold and the third mold may be configured to move along the first direction.

According to one or more exemplary embodiments, a method of manufacturing an electronic device having a window includes arranging a glass on a supporting surface of a second mold, the second mold having a curved surface extending from the supporting surface, moving a third mold located above the second mold, a first mold located above the third mold, and a pressing member located between the first mold and the third mold toward the second mold to support the glass, the third mold defining a guide groove corresponding to the curved surface of the second mold, and the pressing member including a first end coupled to the first mold, and a second end coupled to the guide groove of the third mold, and applying a pressure to at least a portion of the glass by moving the first mold toward the second mold to move the pressing member along the guide groove of the third mold.

The method may include moving at least one of the second mold and the third mold along a first direction to reduce a distance between the second mold and the third mold.

The method may further include moving the pressing member along a supplementary guide groove defined in the first mold, and applying pressure to at least a first portion of the glass such that the first portion of the glass contacts a first portion of the curved surface.

The method may include moving the first mold toward the second mold, the first end of the pressing member along the supplementary guide, and the second end of the pressing member along the guide groove, and the first mold, the first end of the pressing member, and the second end of the pressing member may be moved concurrently.

The method may include applying pressure to a second portion of the glass such that the second portion of the glass contacts a second portion of the curved surface.

The method may further include heating the glass with a heating member in the first mold.

The curved surface may include a first curved surface adjacent to the supporting surface, and a second curved surface extending from the first curved surface, and including a portion of the curved surface that is farthest from an end portion of the supporting surface along the second direction.

BRIEF DESCRIPTION OF THE DRAWINGS

These and/or other aspects will become apparent and more readily appreciated from the following description of the exemplary embodiments, taken in conjunction with the accompanying drawings, in which.

DETAILED DESCRIPTION

Figure 1:
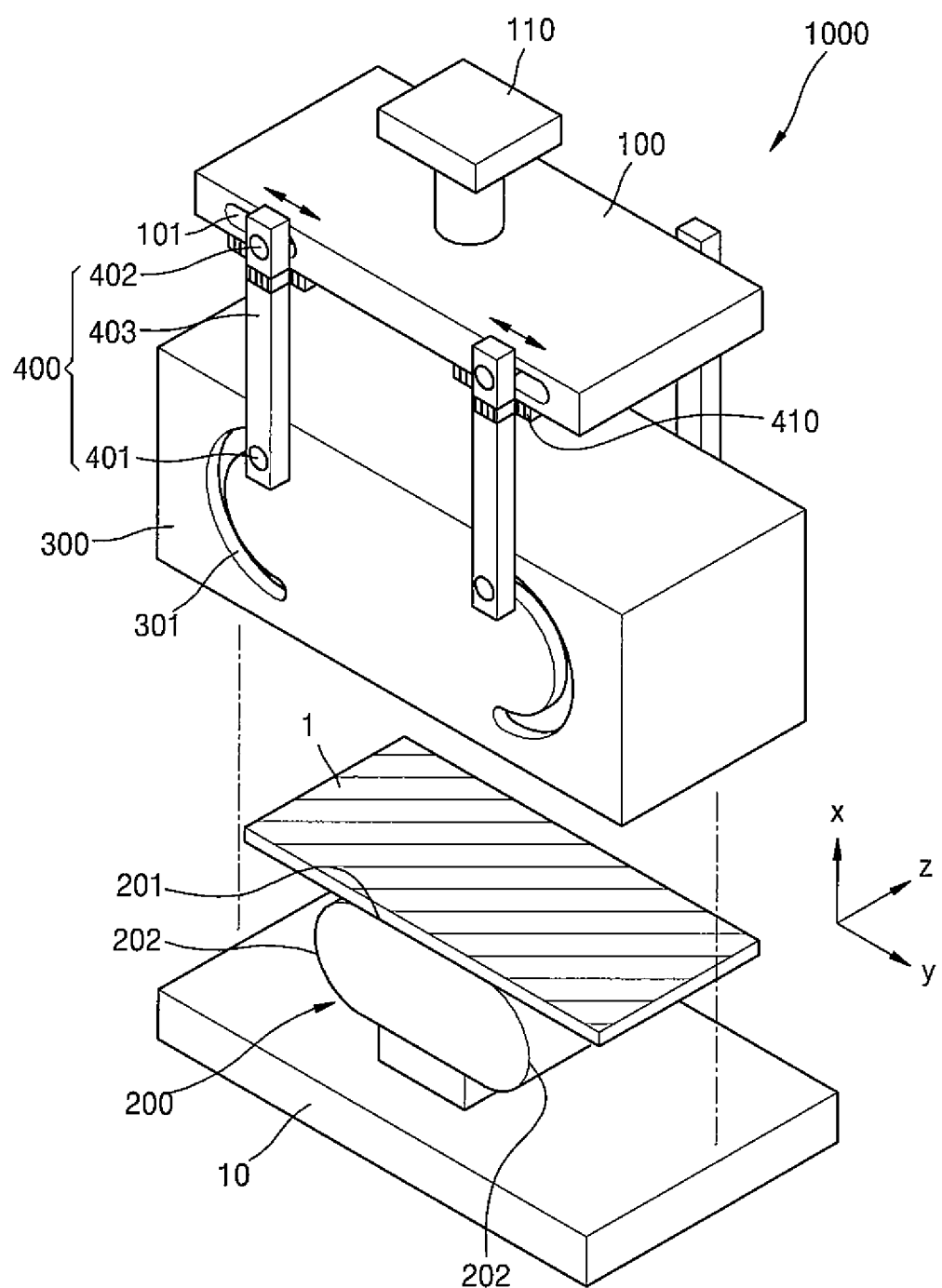
FIG. 1 is a schematic perspective view of a window glass forming apparatus according to one or more exemplary embodiments.

As the invention allows for various changes and numerous embodiments, particular embodiments are illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In the description of the present invention, certain detailed explanations of the related art are omitted when it is deemed that they may unnecessarily obscure the essence of the invention. Unless otherwise noted, like reference numerals denote like elements throughout the attached drawings and the written description, and thus, descriptions thereof will not be repeated. In the drawings, the relative sizes of elements, layers, and regions may be exaggerated for clarity.

While such terms as "first," "second," etc., may be used to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when a layer, region, or component is referred to as being "on," "connected to," or "coupled to" another element or layer, it can be directly on, connected to, or coupled to the other element or layer, or one or more intervening elements or layers may be present In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration. Herein, the use of the term "may," when describing embodiments of the present invention, refers to "one or more embodiments of the present invention." In addition, the use of alternative language, such as "or," when describing embodiments of the present invention, refers to "one or more embodiments of the present invention" for each corresponding item listed.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
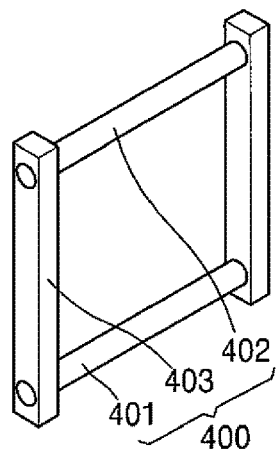
FIG. 2 is a schematic perspective view of a pressing member of the window glass forming apparatus of FIG. 1.

FIG. 1 is a schematic perspective view of a window glass forming apparatus 1000 according to one or more exemplary embodiments, and FIG. 2 is a schematic perspective view of a pressing member 400 of the window glass forming apparatus 1000 of FIG. 1.

Referring to FIGS. 1 and 2, the window glass forming apparatus 1000 includes a first mold 100, a second mold 200, and a third mold 300. The pressing member 400 is arranged between the first mold 100 and the third mold 300. A first end of the pressing member 400 is connected to the first mold 100, and a second end of the pressing member 400 is connected to the third mold 300. A glass 1 is arranged between the second mold 200 and the third mold 300.

As used herein, an x-axis direction (e.g., a first direction) refers to a direction in which the third mold 300 and the first mold 100 are stacked, whereas a y-axis direction (e.g., a second direction) refers to a direction that is perpendicular (or substantially perpendicular) to the x-axis direction and parallel to a direction along which the glass 1 extends. Furthermore, a z-axis direction (e.g., a third direction), as illustrated in FIG. 1, refers to a direction that is perpendicular (or substantially perpendicular) to the x-axis direction and the y-axis direction.

The first mold 100 may be moved along the x-axis direction. For example, the first mold 100 may be moved vertically. Similarly, at least one of the second mold 200 and the third mold 300 may be moved along the x-axis direction (e.g., may be moved up and down along the x-axis direction). The third mold 300 may be connected to the first mold 100 via the pressing member 400 and may be moved along the x-axis direction together with the first mold 100. Also, the pressing member 400 may move in relation to the first mold 100 along a direction crossing the x-axis direction. For example, the pressing member 400 may move relative to the first mold 100 along the y-axis direction (e.g., may move back and forth along the y-axis direction). Hereinafter, for convenience of explanation, descriptions will be given regarding embodiments wherein the second mold 200 is fixed, the first mold 100 and the third mold 300 move up and down (e.g., along the first direction), and the pressing member 400 moves horizontally relative to the first mold 100 (e.g., along the second direction).

The first mold 100 may be driven by a first driver 110, which moves (e.g., is configured to move) the first mold 100 up and down along the x-axis direction. A driving source of the first driver 110 may be one of various suitable types of driving sources, e.g., a motor or a hydraulic cylinder.

The first mold 100 may include a supplementary guide groove (or supplementary guide slot) 101 for coupling to the first end of the pressing member 400. In other words, a groove (e.g., a groove having a certain depth) may be defined in a side surface of the first mold 100, or an opening (or a hole) penetrating through the first mold 100 may be defined therein. Hereinafter, for convenience of explanation, the first mold 100 is described as defining a penetration hole-type supplementary guide slot 101.

The first mold 100 may have two supplementary guide slots 101 that are coupled to the pressing member 400. The supplementary guide slots 101 may be formed to extend along the y-axis direction. However, the present invention is not limited thereto, and numbers, arrangements, and shapes of the supplementary guide slots 101 may vary according to desired shapes of windows and methods of forming window glasses.

The window glass forming apparatus 1000 (e.g., the first mold 100) may further include a heating member for heating the glass 1. The heating member may be, for example, a device capable of generating heat or a device that transmits externally generated heat. The heating member heats the glass 1 to a glass forming temperature, e.g., a temperature of from about 700° C. to about 1000° C., thereby softening the glass 1 so that it may be formable (or deformable).

Referring to FIG. 2, the pressing member 400 includes a pressing bar 401, a supplementary bar 402, and a connecting bar 403 that supports the pressing bar 401 and the supplementary bar 402. The connecting bar 403 may extend along the x-axis direction.

The supplementary bar 402 may be arranged at an end (e.g., a first end) of the connecting bar 403 near the first mold 100. The supplementary bar 402 may extend along the third direction between the supplementary guide slot 101 defined in a first side surface of the first mold 100 and a supplementary guide slot defined in a second side surface of the first mold 100, opposite to the first side surface.

The supplementary bar 402 may move along the supplementary guide slot 101 of the first mold 100. The supplementary bar 402 may be guided by the supplementary guide slot 101 of the first mold 100 and may move along the y-axis direction relative to the first mold 100. The pressing member 400 may be driven by a separate driver, such that the supplementary bar 402 may move linearly back and forth along the y-axis direction. Like the first driver 110, the separate driver may utilize a motor or a hydraulic cylinder as a driving source, for example.

An angle maintaining member 410 may be installed on the connecting bar 403, such that the supplementary bar 402 is stably guided by the supplementary guide slot 101. For example, the angle maintaining member 410 may have a plate-like shape. As such, the connecting bar 403 may contact a surface of the first mold 100 and the angle maintaining member 410 may prevent or reduce the likelihood of the connecting bar 403 tilting or oscillating while the pressing member 400 is moved.

The pressing bar 401 may be supported by the connecting bar 403 below the supplementary bar 402. In other words, the pressing bar 401 may be arranged at an end (e.g., a second end) of the connecting bar 403 near the third mold 300.

The pressing bar 401 may be connected to a guide groove (or a guide slot) 301 of the third mold 300. Like the supplementary guide groove (or supplementary guide slot) 101 of the first mold 100, the guide groove or guide slot 301 of the third mold 300 may be a groove (e.g., a groove formed to a certain depth), or a penetration opening (e.g., a penetration hole). Hereinafter, for convenience of explanation, the third mold 300 is described as defining a penetration hole-type guide slot 301.

A number of the guide slots 301 may be the same as a number of the supplementary guide slots 101. The guide slot 301 may be formed to have a curved shape, but various modifications may be made to locations and shapes of the guide slot 301 based on locations and shapes of the supplementary guide slots 101.

The pressing bar 401 may extend along the third direction between the guide slot 301 defined in a first side surface of the third mold 300 and a guide slot defined in a second side surface of the third mold 300 opposite to the first side surface. The pressing bar 401 may have a shape that is the same as or similar to that of the supplementary bar 402. The pressing bar 401 may be installed on the connecting bar 403 to be parallel to the supplementary bar 402.

The pressing bar 401 moves along the guide slot 301 of the third mold 300. The pressing bar 401 may be guided by the guide slot 301 of the third mold 300 and may move along a constant curve. Therefore, the pressing bar 401 may form a window having a curved surface by moving along the guide slot 301 of the third mold 300 and may bring at least a portion of the glass 1 into contact with the second mold 200. The pressing bar 401 may extend along a particular direction, such that the pressing bar 401 may be brought into contact with a surface of the glass 1. For example, the pressing bar 401 may extend along the z-axis direction, which is perpendicular to the x-axis direction and the y-axis direction.

The third mold 300 may initially be located above the second mold 200. The third mold 300 may have a hollow portion defined therein. Therefore, the third mold 300 may move downwardly (e.g., in the x-axis direction) toward the second mold 200 and may accommodate the second mold 200 in the hollow portion. However, the present invention is not limited thereto, and the third mold 300 may consist of two flat plates that are installed at respective ends of the pressing bar 401 of the pressing member 400 to face each other, for example.

A protruding supporter 302 (see FIGS. 3-5) may be formed on a surface of the hollow portion of the third mold 300. The protruding supporter 302 may support the glass 1 together with the second mold 200 when the glass 1 is formed by the pressing bar 401. Therefore, at least a portion of the protruding supporter 302 may protrude toward the glass 1.

The second mold 200 may be initially arranged below the third mold 300. The glass 1 may be arranged on the second mold 200. The second mold 200 may include a supporting surface 201 for supporting the glass 1, such that the glass 1 is stably arranged thereon. The supporting surface 201 may be a flat surface, and thus the glass 1 may be stably supported on the supporting surface 201. Therefore, the glass 1 may be interposed between the supporting surface 201 of the second mold 200 and the protruding supporter 302 of the third mold 300, and may be supported such that the glass 1 does not move during the curving process.

The second mold 200 may further include a curved surface 202 adjacent to the supporting surface 201. The curved surface 202 may extend from the supporting surface 201. Unlike the supporting surface 201, the curved surface 202 is arranged to be apart from the hollow portion of the third mold 300 and does not contact the glass 1 before curvature of the glass 1 begins. The curved surface 202 and the pressing bar 401 together curve (or form) the glass 1, and the curved surface 202 has a shape that corresponds to a curved shape of a window. Therefore, the guide slot 301 of the third mold 300 may also be formed in correspondence to a shape of the curved surface 202. Additional descriptions of the shape of the curved surface 202 are provided below with reference to FIGS. 3 to 5.

As described above, the second mold 200 may be accommodated inside the third mold 300. Furthermore, a supporting base 10 may be arranged below the second mold 200. As a result, the third mold 300 may be stably supported on the supporting base 10, and thus the glass 1 may be firmly supported between the second mold 200 and the third mold 300.

Figure 3:
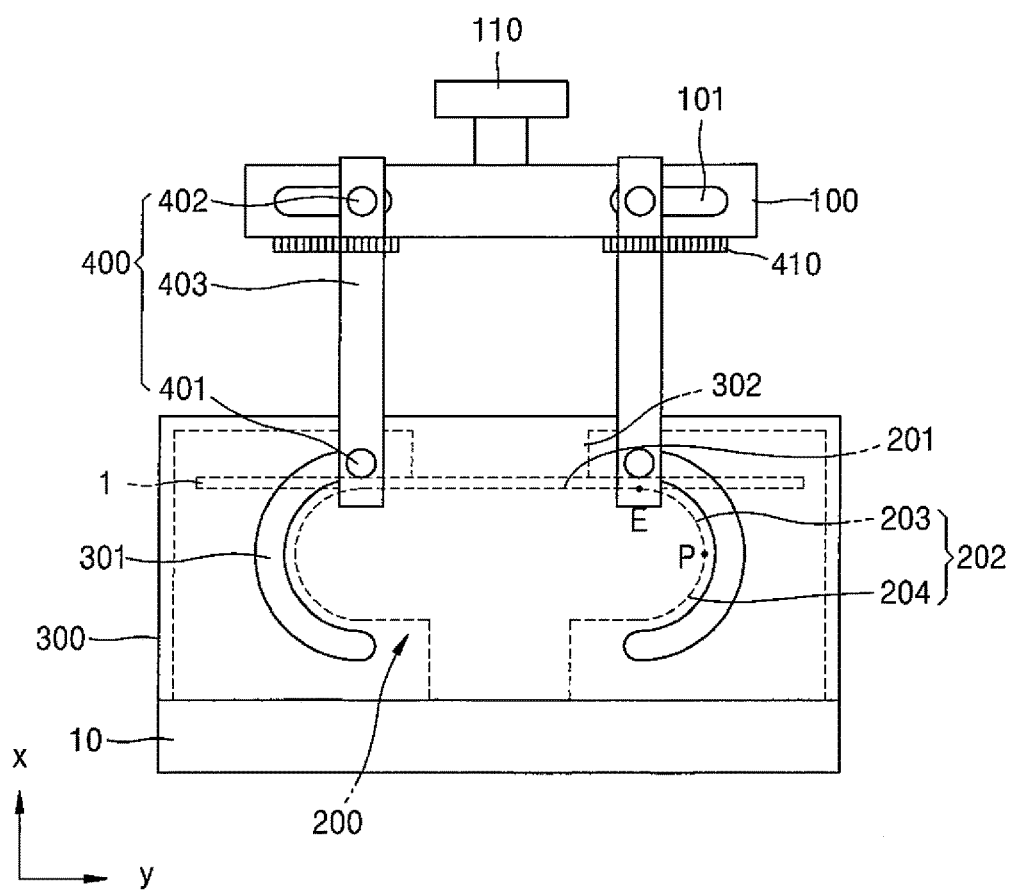
FIGS. 3-5 are schematic lateral views sequentially showing formation of a glass by using the window glass forming apparatus of FIG. 1.
Figure 4:
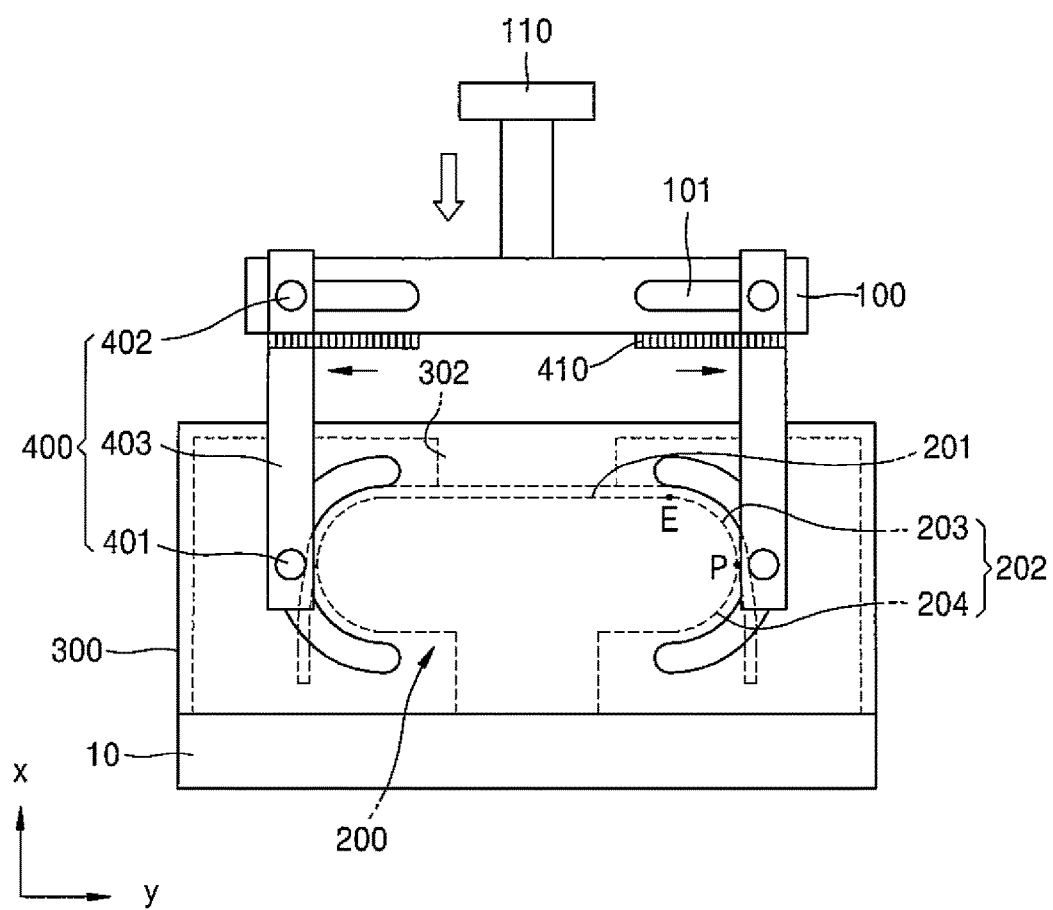
Figure 5:
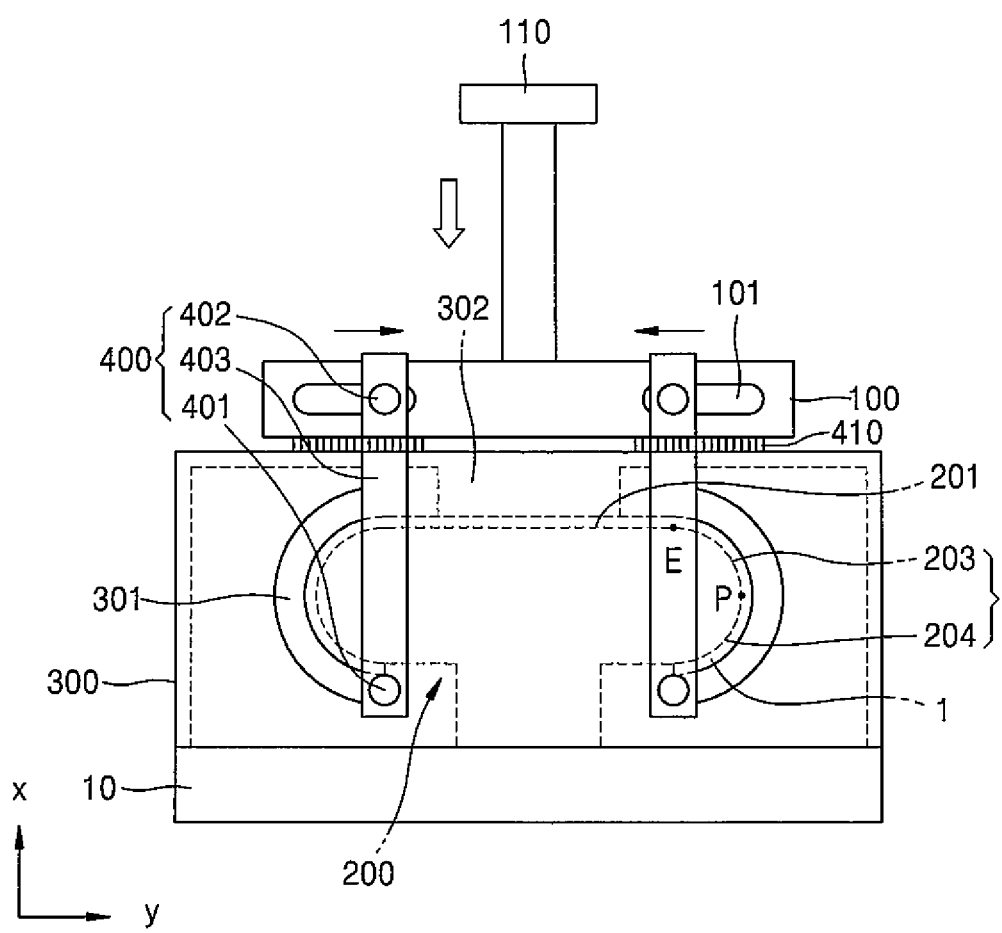

FIGS. 3 to 5 are schematic lateral views sequentially showing formation of a glass by using the window glass forming apparatus of FIG. 1.

As shown in FIG. 3, a glass 1 is arranged on the supporting surface 201 of the second mold 200.

As the first mold 100 moves downwardly along the x-axis direction, the pressing member 400 coupled to the first mold 100 and the third mold 300 coupled to the pressing member 400 move downwardly along the x-axis direction. The first mold 100 moves downwardly until the third mold 300 is stably supported on the supporting base 10. As such, as the third mold 300 is stably supported on the supporting base 10, the glass 1 is interposed between the protruding supporter 302 of the third mold 300 and the supporting surface 201 of the second mold 200. Therefore, the glass 1 may be supported between the third mold 300 and the second mold 200. A portion of the glass 1 that does not contact the supporting surface 201 of the second mold 200 may contact neither the second mold 200 nor the third mold 300. In other words, end portions of the glass 1 may be free ends not restrained by any supporting member.

Much like the protruding supporter 302 of the third mold 300, the pressing bar 401 may support the glass 1 together with the second mold 200. Hereinafter, for convenience of explanation, descriptions will be given regarding embodiments wherein two pressing members 400 are arranged, as shown in FIG. 3.

Next, as shown in FIG. 4, as the first mold 100 continues to move along the x-axis direction, a separate driver may move the pressing members 400 (e.g., may move the pressing members 400 back and forth) to begin curving (or forming) the glass 1.

When the third mold 300 is stably supported on the supporting base 10 and the first mold 100 moves toward the second mold 200, as described above, the supplementary bars 402 of the respective pressing members 400 move in relation to the first mold 100 along the respective supplementary guide slots 101 of the first mold 100. When the supplementary bars 402 move along the respective supplementary guide slots 101, the pressing bars 401 also move along the respective guide slots 301 of the third mold 300. Here, the pressing bars 401 move from an end portion E of the supporting surface 201 along the curved surface 202, apply a pressure to a respective one of the end portions of the glass 1 that does not contact the supporting surface 201 of the second mold 200, and bring the end portions of the glass 1 into contact with the curved surface 202 of the second mold 200. As a result, the end portions of the glass 1 are curved according to the shape of the curved surface 202 of the second mold 200.

The curved surface 202 may include a first curved surface 203 and a second curved surface 204. The first curved surface 203 may be adjacent to the supporting surface 201, and the second curved surface 204 may extend from the first curved surface 203 and includes a portion P that is farthest from the end portion E of the supporting surface 201 in the curved surface 202 along the y-axis direction.

Referring to FIG. 3, when curvature of the glass 1 begins, the pressing bar 401 of the pressing member 400 is located directly above the end portion E of the supporting surface 201. Here, the pressing members 400 are arranged to be relatively close to each other. Next, as the pressing bars 401 move along the guide slots 301, the glass 1 is brought into contact with at least a portion of the first curved surface 203 and the glass 1 is thus curved. Here, the pressing members 400 move along the y-axis direction, such that a distance between the pressing members 400 (e.g., a distance between the pressing bars 401) gradually increases.

As shown in FIG. 4, when the pressing bars 401 arrive at locations corresponding to the portions P, at which the pressing bars 401 are farthest from the end portions E of the supporting surface 201 along the y-axis direction, the pressing members 400 are also farthest from each other.

Next, as shown in FIG. 5, as the pressing bars 401 continue to move along the respective guide slots 301, the end portions of the glass 1, which did not initially contact the second mold 200, contact the second curved surface 204 and are thereby curved. Here, the pressing member 400 moves along the y-axis direction, such that the distance between the pressing members 400 (e.g., the distance between the pressing bars 401) gradually decreases, and thus the pressing members 400 are finally arranged to be relatively close to each other again.

Although descriptions are given above with regard to embodiments wherein the glass 1 is curved on a single plane, e.g., an X-Y plane, the present disclosure is not limited thereto.

According to one or more exemplary embodiments, a window glass forming apparatus may be designed such that the glass 1 may be curved not only along an X-Y plane, but also along other planes. For example, a window glass forming apparatus may be designed such that, as the first mold 100 moves along the x-axis direction, the glass 1 may be curved concurrently (or simultaneously) on an X-Y plane and an X-Z plane. As such, the guide grooves (or guide slots) 301 may be arranged not only on both side surfaces of the third mold 300 that are parallel to the X-Y plane, but also on both side surfaces of the third mold 300 that are parallel to the X-Z plane. Therefore, curved surfaces having various shapes may be formed by appropriately adjusting locations and numbers of the supplementary guide grooves (or supplementary guide slots) 101, the guide grooves (or guide slots) 301, and the pressing bars 401.

According to one or more exemplary embodiments, two opposite ends of the glass 1 may be curved by different angles on a single plane. As such, shapes of the guide grooves (or guide slots) 301 may be different from each other according to the curving angles.

As a result of the forming operations as described above, the glass 1 may be formed as a window having a curved surface. In other words, an angle at which the glass 1 is curved may be adjusted, and the glass 1 may be curved and may also be rolled. Therefore, it may be relatively easy to form a window having a curved surface with a complex shape, where time and power used for operations for forming the same may be reduced by simplifying the operations. Furthermore, embodiments of the present disclosure may be easily combined with various apparatuses, e.g., a pressing roller, a press mold, etc., and thus the glass 1 may be machined to have various suitable shapes. For example, a portion of the glass 1 may be formed by using a window glass forming apparatus according to one or more exemplary embodiments, whereas another portion of the glass 1 may be formed by using a pressing roller, a press mold, or one of various other apparatuses. As an example, the forming operations may be simultaneously performed as a single process.

As described above, according to one or more of the above exemplary embodiments, a window having a curved surface with a complex shape may be formed, where time and power used for operations for forming the same may be reduced by simplifying the operations. However, the present disclosure is not limited to the above-stated aspects.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope, as defined by the following claims and their equivalents.

What is claimed is:

1. A method of manufacturing an electronic device comprising a window, the method comprising:
    arranging a glass on a supporting surface of a second mold, the second mold having a curved surface extending from the supporting surface;
    moving a third mold located above the second mold, a first mold located above the third mold, and a pressing member located between the first mold and the third mold toward the second mold to support the glass, the third mold defining a guide groove corresponding to the curved surface of the second mold, and the pressing member comprising:
        a first end coupled to the first mold; and
        a second end coupled to the guide groove of the third mold; and
    applying pressure to at least a portion of the glass by moving the first mold toward the second mold to move the pressing member along the guide groove of the third mold.

2. The method of claim 1, comprising moving at least one of the second mold and the third mold along a first direction to reduce a distance between the second mold and the third mold.

3. The method of claim 1, further comprising:
    moving the pressing member along a supplementary guide groove defined in the first mold; and
    applying pressure to at least a first portion of the glass such that the first portion of the glass contacts a first portion of the curved surface.

4. The method of claim 3, comprising moving the first mold toward the second mold, the first end of the pressing member along the supplementary guide groove, and the second end of the pressing member along the guide groove,
    wherein the first mold, the first end of the pressing member, and the second end of the pressing member are moved concurrently.

5. The method of claim 3, further comprising applying pressure to a second portion of the glass such that the second portion of the glass contacts a second portion of the curved surface.

6. The method of claim 1, further comprising heating the glass with a heating member in the first mold.

7. The method of claim 1, wherein the curved surface has:
    a first curved surface adjacent to the supporting surface; and
    a second curved surface extending from the first curved surface, and comprising a portion of the curved surface that is farthest from an end portion of the supporting surface along a second direction.

* * * * *